United States Patent [19]

Jackman et al.

[11] Patent Number: 4,906,164
[45] Date of Patent: Mar. 6, 1990

[54] HAND-PORTABLE FIRE FIGHTING, POSITIVE PRESSURE BLOWER

[75] Inventors: William L. Jackman, Nine Mile Falls; Ronald M. Ovnicek, Deer Park, both of Wash.

[73] Assignee: Darrell Lee Siria, Spokane, Wash.

[21] Appl. No.: 358,159

[22] Filed: May 26, 1989

[51] Int. Cl.[4] .......................................... F04D 29/52
[52] U.S. Cl. ................................. 416/63; 416/246; 416/247 R
[58] Field of Search ............. 416/63, 55, 246, 247 R, 416/170 C; 169/91, 52, 48

[56] References Cited

U.S. PATENT DOCUMENTS

| | | | |
|---|---|---|---|
| 672,303 | 4/1901 | Williams | 416/246 X |
| 1,254,042 | 1/1918 | Howe | 416/63 |
| 1,598,568 | 8/1926 | Fields | 169/91 X |
| 1,972,654 | 9/1934 | Heath | 416/63 X |
| 2,215,035 | 9/1940 | Gundelfinger | 416/246 |
| 2,345,516 | 3/1944 | Weber | 416/247 X |
| 2,884,075 | 4/1959 | Poon | 416/63 X |
| 2,949,158 | 8/1960 | Lowry | 169/91 X |
| 3,128,036 | 4/1964 | McBride | 169/91 X |
| 4,657,483 | 4/1987 | Bede | 416/247 R X |

OTHER PUBLICATIONS

Product Advertisement, "Tempest Certified Performance for Belt-Driven Power Blower", Tempest Technology Corporation, Fresno, Calif., Catalog No. 1A (9/1988).
Product Catalog, "Gasoline and Electrical Powered Smoke-Movers and Accessories", Controlled Airstreams, Inc., McMinnville, Ore., Catalog 103 (7/1984).
Product Advertisement, "New Product Update—LifeJack's the PPV", Mays Equipment Company, Federal Way, Wash., (Oct. 1988).
Product Advertisement, "New Super Vac Gas Positive Pressure Smoke Ventilators", Super Vac Manufacturing Co., Inc., Loveland, Colo. (1988).
Product Advertisement, "Gasoline Powered Smoke Fans", Halprin Supply Company, Los Angeles, Calif. (Date Unknown).

*Primary Examiner*—Everette A. Powell, Jr.
*Attorney, Agent, or Firm*—Wells, St. John & Roberts

[57] ABSTRACT

The drawings and description describe a hand-portable fire fighting, positive pressure blower 10 for providing positive pressure within a smoke filled space to remove the smoke, heat and carbon dioxide from a smoke filled space to facilitate the extinguishment of the fire and the overhauling of the space subsequent to the extinguishment. It further greatly enhances the safety of the fire fighters. The blower 10 includes a portable support frame 12 having an internal combustion engine 13 mounted thereon with a two blade wooden prop 18 mounted on the drive shaft for generating a cylindrical stream of fast moving air to be directed into the smoke filled space. The blower 10 includes a tilting mechanism 22 that has a lead screw with a crank that extends between a front leg frame section 58 and a central frame section 24. The front leg section 28 has a vibrational dampening cross frame element 60 that extends between the forward extending left front leg 62 and the right front leg 64. The supporting frame 12 includes a handle frame element 44 that substantially circumscribes the internal combustion 14 for protecting the engine from damage. As illustrated in FIG. 2, the unit when in the contracted position forms a very compact unit that may be readily mounted in a small compartment on a fire fighting vehicle.

10 Claims, 2 Drawing Sheets

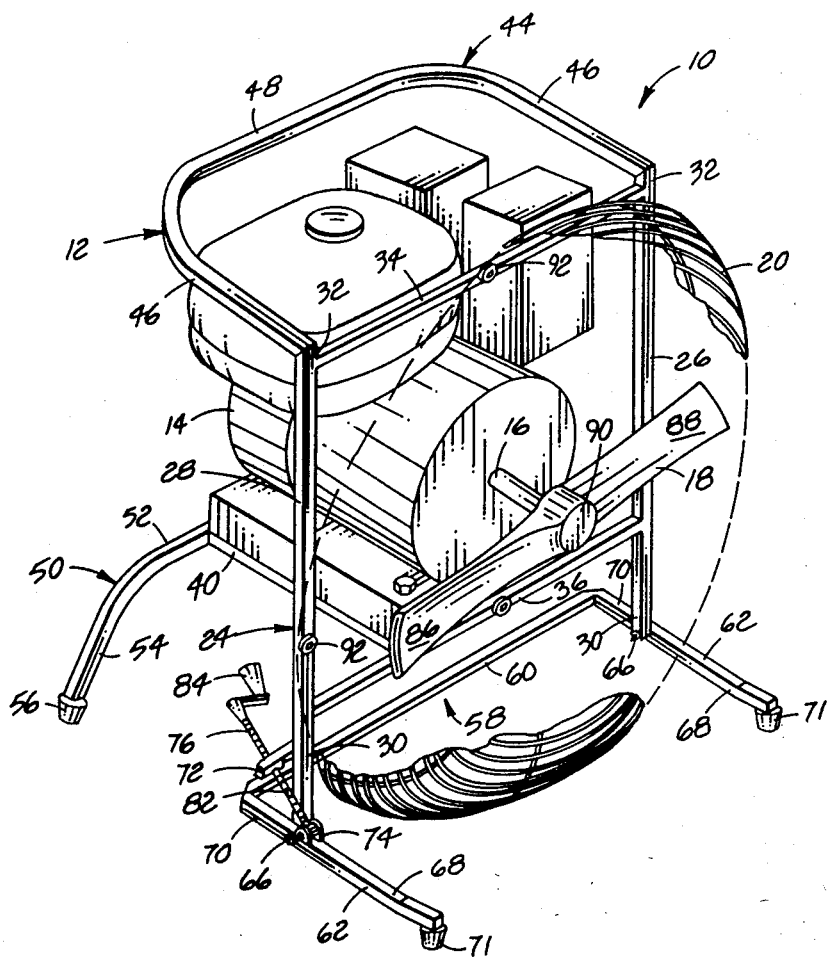
FIG. I

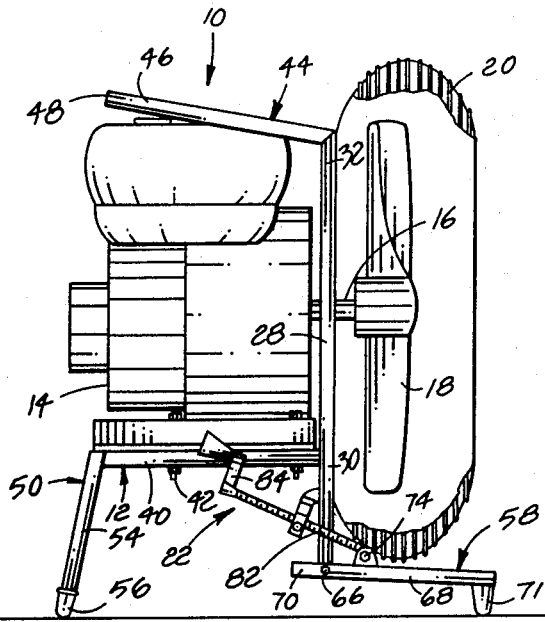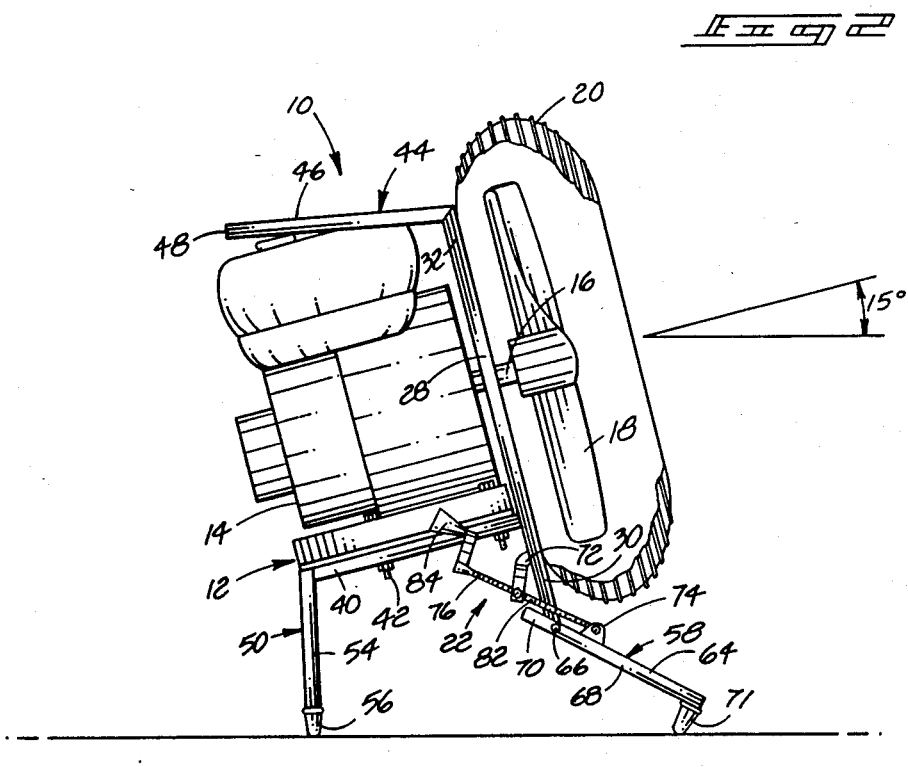

HAND-PORTABLE FIRE FIGHTING, POSITIVE PRESSURE BLOWER

TECHNICAL FIELD

This invention relates to fire fighting equipment and more particularly to hand portable fire fighting, positive pressure blower classified in Class 169, subclass 99.

BACKGROUND OF THE INVENTION

It has been found that positive pressure ventilation of a structure sustaining an internal fire has many advantages. The use of positive pressure ventilation techniques usually results in removing the smoke in a fraction of the time previously required. The faster evacuation of smoke reduces smoke damage. Most importantly the rapid removal of the smoke dramatically increases fire fighting safety. The firemen have considerably greater visibility to see within the burning structure and to rapidly locate the hot spots without having to crawl on the floor. Also, the speedy removal of smoke and the replacement with cool fresh air allows breathing apparatus to be removed sooner. Overall physical stress of fire fighters is reduced with less stress related injuries. This all results in greater fire fighting productivity in being able to put the fire out more quickly. Furthermore, such a procedure causes less smoke and fire damage and increases fire fighter safety.

To be able to obtain the many advantages of positive pressure ventilation, a lightweight, hand portable positive pressure blower is required that can be easily maneuvered into position in front of an opening to the structure. The blower must be sufficiently compact to be able to conveniently fit on a fire fighting vehicle without interfering with other equipment. More particularly the blower need fit within a rather compact compartment on the vehicle. In addition it is necessary that the blower be able to direct a large volume of air in a rather confined directional air stream that is vertically adjustable.

Although there are a number of portable positive pressure blowers presently on the market, they are generally difficult to store in a small confined compartment on the fire engine. Furthermore such units generally, when in use, vibrate excessively and progressively change position. Consequently, it is not unusual for a fire fighter to either stand and hold the blower in place or to provide some type of hold down mechanism.

One of the objects and advantages of the present invention is to provide a compact, hand portable positive pressure blower that can be easily stored on a fire fighting vehicle, particularly in a rather small compartment.

A further object of this invention is to provide such a blower in which the vibration of the blower is sufficiently dampened so that it will not move when in full operation at its highest capacity.

An additional object of this invention is to provide such a blower that may be tilted at an infinite variation between zero and fifteen degrees without adversely affecting its stability.

These and other objects and advantages will become apparent upon reading the following description of a preferred embodiment of this invention.

BRIEF DESCRIPTION OF THE DRAWINGS

The preferred embodiment of the invention is illustrated in the accompanying drawings, in which:

FIG. 1 is a perspective view of a preferred embodiment of this invention, illustrating a compact, hand-portable, positive pressure blower, particularly emphasizing the frame structure;

FIG. 2 is a side view of the blower illustrated in FIG. 1, illustrating the blower at a zero inclination; and FIG. 3 is a side elevation view similar to FIG. 2, except showing the blower at a fifteen degree inclination and the orientation of the front legs.

DETAILED DESCRIPTION OF THE PREFERRED EMBODIMENT

The following disclosure of the invention is submitted in compliance with the constitutional purpose of the Patent Laws "to promote the progress of science and useful arts" (Article 1, Section 8).

Referring now in detail to the drawings, there is illustrated in FIG. 1, a hand-portable fire fighting, positive pressure blower generally designated with the numeral 10 for creating a rather high velocity stream of air for directing such stream of air into a smoke filled space of a burning structure for assisting the fire fighters in (1) putting out the fire within the structure and (2) overhauling the structure after the fire has been extinguished.

The blower 10 includes a portable support frame generally designated with the numeral 12 for supporting an internal combustion engine 14 thereon. The internal combustion engine 14 has a drive shaft 16 extending substantially horizontal therefrom. A propeller 18 is mounted on the drive shaft for rotating with the drive shaft to generate a stream of high velocity air that is directed from the outside of a smoke filled space and driving or displacing the smoke from the space. The propeller 18 has a propeller guard 20 mounted about the propeller to prevent a fire fighter from being injured from the rotating propeller.

The blower 10 further includes a tilting mechanism 22 for tilting the internal combustion engine 14 and propeller 18 in an infinitely variable angle between zero and 15 degrees to accurately adjust the elevational direction of the stream of outside air.

The portable support frame 12 includes a central frame section 24 that has a left upright pillar frame element 26 and a right upright pillar frame element 28 that extend upward between the internal combustion engine 14 and the propeller 18. Each of the frame elements 26 and 28 extend from lower ends 30 to upper ends 32. The central frame section 24 includes transverse or cross base elements 34 and 36 that extend substantially parallel with each rigidly interconnecting the pillar frame elements 26 and 28. The transverse brace elements 24, 26 extend transversely between the internal combustion engine 14 and the propeller 18. The central frame section 24 includes engine mount frame elements 40 that extend rearward from the cross brace element 36. The internal combustion engine 14 is mounted to the engine mount frame elements 40 by engine mount bolts 42.

The central frame section 24 further includes the handle frame element 44 that is substantially U-shaped with side rail sections 46 that are affixed to the upper ends 32 of the pillar frame elements 26 and 28, respectively, and extend rearward along the side of the engine over the engine to a central rear rail 48. The handle frame element 44 is preferably formed as a unitary part. Portable support frame 12 further includes a rear leg frame section 50 that is preferably formed as a unitary U-shaped part having a horizontal portion 52 and rear legs 54 extending downward and rearward at an inclined angle with respect to the central frame section 24.

All of the frame elements 26, 28, 34, 36, 40 and 48 are preferably made of tubular metal or a composite material and are welded together to form a rigid frame structure. Rubber feet or mounts 56 are mounted to the lower end of the rear legs 54 for engaging a substantially horizontal surface.

The portable support frame 12 further includes a front leg frame section generally designated with the numeral 58 that is likewise preferably formed of a unitary U-shaped frame part consisting of a cross frame element 60 and a left front leg 62 and a right front leg 64 that extend forward from the cross element 60. The front leg frame section 58 is pivotally mounted to the lower ends 30 of the pillar frame elements 26 and 28 respectively at pivot locations 66. It is quite important that the cross frame elements 60 not be directly connected to the central frame section 24 as the cross frame element 60 serves as a vibrational dampening frame element for materially dampening the vibration caused by the internal combustion engine 14 and the propeller 18. Furthermore the cross frame element 60 serves as a torsion bar between the left front leg 62 and the right front leg 64 to further decrease the vibration and to cause torsional forces to be transferred from one front leg to the other front leg. Each of the front legs 62 and 64 have a forward portion 68 that extends from the pivot point 66 to forward ends supported on rubber feet or pads 71. Additionally, each of the front legs 62 and 64 has a rearward portion 70 that extends rearward from the pivot 66 to the cross frame element 60. Consequently, the forward portion 68 pivots up and down about the pivot 66 to raise and lower the front end of the blower 10 to tilt the frame between zero and 15 degrees.

The tilting mechanism 22 includes a screw bracket 72 welded to a lower end 30 of one of the upright pillar frame elements 26, 28. The tilting member 22 includes a screw bracket 74 welded to a forward portion 68 of one of the front legs 62, 64. A screw assembly 76 is operatively interconnected between the screw brackets 72 and 74. The screw assembly 76 includes a screw bearing rotatably mounted at the screw bracket 72 and a screw bearing mounted at the screw brackets 74. The screw bearings receive a lead screw 82 for providing an infinite adjustment of the distance between the screw brackets 72 and 74 about the pivot axis 66 to provide an infinitely variable adjustment of the tilted angle. A crank 84 is mounted to the screw 82 for manually turning the screw 82 to adjust the inclination. In FIG. 2 the screw is turned to position the blower at the zero or contracted orientation with the drive shaft 16 being substantially parallel with the supporting horizontal surface. FIG. 3 shows the screw 82 having been rotated a certain degree to adjust or pivot the front legs 62 and 64 downwardly to position the shaft 16 at an angle approximately 15 degrees to horizontal to direct the high velocity air stream at an upward angle.

The rubber feet or pads 56 and 71 are formed of a rather soft rubber material of between 30–40 durometer to additionally assist in absorbing the vibration of the blower and to provide good frictional contact between the legs of the blower and the horizontal surface. It has been found that the unit, particularly because of the cross frame element 60, absorbs most of the vibration and that the unit will stay stationary even though the engine is operated at its maximum speed. Thus a fire fighter is not required to stand at the unit to hold the unit in place during operation.

The propeller 18 is preferably constructed of a wood material having two opposing blades 86 and 88 that extend radially outward on opposite sides of a hub 90. The hub 90 is mounted on the shaft 16 by direct connection. There is no speed reduction between the drive shaft and the propeller. The applicant has found that a solid wood propeller has many advantages over other propellers when operating at rather high speeds.

The propeller guard 20 is mounted about the propeller 18 utilizing guard mounting clamps 92 that are illustrated in FIG. 1.

It should be noted that when the blower is in a contracted position as illustrated in FIG. 2 in which the frame elements extend just a slight distance beyond the engine and propeller assembly to provide a very compact unit. The upper handle structure protects the engine from damage should the unit be tipped over. It should be noted that the front legs 62 and 64 extend underneath the propeller at a very close distance to provide maximum support while providing a very compact unit that can be easily stored in a rather small compartment in a fire fighting vehicle.

It should be noted the propeller is shroudless. The propeller 18 with the two oppositely directed blades formed of wood which provide a sufficiently confined stream of air that is very directional in nature. Many of the prior art devices utilize a shroud about the propeller with multiple fan blades in an attempt to confine and direct a cylinder of fast moving air towards the opening of the smoke filled space. The applicants' design does not require such a shroud.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms of modifications within the proper scope of the appended claims appropriately interpreted in accordance with the doctrine of equivalents.

We claim:

1. A hand-portable fire fighting, positive pressure blower, normally stored on a fire fighting vehicle, that may be easily removed from the vehicle and used for removing smoke from a smoke filled space of a structure, comprising:

a portable support frame for supporting the blower on a substantially horizontal surface adjacent an opening to the smoke filled space;

an internal combustion engine mounted on the frame for rotating a propeller drive shaft;

a propeller operatively connected to the drive shaft for directing a stream of outside air through the opening and into the smoke filled space to create a positive air pressure within the space to displace the smoke with the outside air;

a propeller guard mounted on the frame surrounding the propeller;

said portable support frame having;

(1) a central frame section receiving the internal combustion engine and having central frame pillar elements extending downward between the internal combustion engine and the propeller to lower ends;

(2) a rear leg section operatively connected to the central frame section for engaging the horizontal surface rearward of the internal combustion engine;

(3) a U-shaped front leg section having two laterally spaced front legs and a vibration dampening transverse frame element in which the section is pivotally mounted to the lower ends of the pillar elements for pivotal movement about a transverse axis with the spaced front legs extending (a) forward from the transverse axis underneath the propeller guard terminating in surface engaging feet forward of the propeller, and (b) rearward from the transverse axis to the vibration dampening transverse frame element with the transverse frame element serving as a vibration absorbing component to prevent the blower from moving on the horizontal surface due to vibration of the internal combustion engine; and manual tilting means operatively interconnecting the central frame section and the U-shaped front leg section for pivoting the central frame section about the transverse axis to adjust the inclination of the spaced front legs and in response thereto to adjust the elevational direction of the air stream through the structure opening.

2. The hand-portable fire fighting, positive pressure blower as defined in claim 1 wherein the manual tilting means is operatively connected between the central frame section and the pair of front legs for infinitely adjusting the inclination of the front legs between a compact horizontal orientation and an expanded tilted orientation with respect to the horizontal surface to enable fire fighters to adjust the angle of the outside air stream.

3. The hand-portable fire fighting, positive pressure blower as defined in claim 1 wherein the surface engaging front feet are made of vibration dampening material.

4. The hand-portable fire fighting, positive pressure blower as defined in claim 1 wherein the front legs and the vibration dampening frame element are formed of an integral U-shaped member.

5. The hand-portable fire fighting, positive pressure blower as defined in claim 1 wherein the tilting means includes a first screw mounting bracket affixed to the central frame section and a second screw mounting bracket affixed to one of the front legs and a drive screw extending between the first and second screw mounting brackets for pivoting the one front leg relative to the central frame section for tilting the blower in response to the movement of the drive screw.

6. The hand-portable fire fighting, positive pressure blower as defined in claim 1 wherein the propeller has only two opposing blades formed of wood.

7. The hand-portable fire fighting, positive pressure blower as defined in claim 1 where the central frame section includes (1) two pillar frame elements extending downward to the front legs section between the internal combustion engine and the propeller, (2) transverse brace frame elements extending between the two pillar frame elements between the internal combustion engine and the propeller, and (3) a handle frame element affixed to the two pillar frame elements and extending rearward over the internal combustion engine to facilitate manual manipulation of the blower.

8. The hand-portable fire fighting, positive pressure blower as defined in claim 3 wherein the vibration dampening feet are made of a rubber material having a hardness of between 30 and 40 durometer.

9. The hand-portable fire fighting, positive pressure blower as defined in claim 1 wherein the supporting frame is constructed of square tubular metal material.

10. The hand-portable fire fighting, positive pressure blower as defined in claim 1 wherein the rear leg extends downward and rearward from the central frame section at an inclined angle.

* * * * *